July 5, 1938.  C. B. McELWAINE  2,122,987
GAS REGULATING VALVE
Filed June 19, 1936  3 Sheets-Sheet 1

Clayton B. McElwaine
INVENTOR

BY
ATTORNEY

July 5, 1938.  C. B. McELWAINE  2,122,987
GAS REGULATING VALVE
Filed June 19, 1936   3 Sheets-Sheet 2

Clayton B. McElwaine
INVENTOR

BY
ATTORNEY

Clayton B. McElwaine
INVENTOR

BY Philip W. H. Terrell
ATTORNEY

Patented July 5, 1938

2,122,987

UNITED STATES PATENT OFFICE 2,122,987

GAS REGULATING VALVE

Clayton B. McElwaine, Tulsa, Okla., assignor of fifty-one per cent to Henry N. Greis, Tulsa, Okla.

Application June 19, 1936, Serial No. 86,186

11 Claims. (Cl. 277—42)

At the present time there is a huge network of large diameter pipe lines, often from 24 to 32 inches in diameter, extending over a vast territory of the United States and involving main trunk lines and a network of laterals spreading therefrom and also involving several billion dollars in investment. This system is used for distributing gas to users in various sections of the United States, and is also planned for expansion of gas demands.

Advanced operating methods to the deeper drilling depths, have opened up new gas producing horizons of a density hard to manage. Well pressures of 2000 pounds per square inch are quite common, some of 3000 pounds having been encountered and their product utilized under difficulties. A pressure of 2000 pounds per square inch is equal to the raising of a column of water 8,666 feet or almost 1¾ miles high, which gives an idea of the enormous potential energy and the cutting power of this pressure blast.

To tame and reduce this force to safe line carrier limits is the real job of a regulator. In doing this work the regulator is met by two strong resisting forces of cutting out of valves and ports, "wire drawing", and the forming of ice to close areas, and the freezing and sticking of the moving parts rendering the device incapable of its intended automatic function. The freezing is caused by the natural law of heat loss of expanding gases and the principle is the same as utilized in cold storage plants. These two foes of pressure reduction are hard to overcome in extreme high pressure conditions. If they gain control of the pressure reducing operation, havoc results in allowing pressures to forbidden down stream areas with resulting danger to life and damage to equipment. To overcome all of the above objections a regulator is provided wherein the pressure is stepped down from an extremely high pressure through successive reduction steps to a low pressure on the down stream or discharge side of the valve, and which pressure on the down stream side is maintained constant.

A further object of the invention is to provide stages of pressure reduction from the high pressure side of the valve to the low side and constructed in a manner whereby the cooperating parts at the various pressure reduction stages are constructed in a manner for reducing the possibilities of wire cutting of the valve parts to a minimum, thereby increasing the life of a valve as a whole.

A further object is to provide diaphragm control means for moving the valve and to control said diaphragm means from the down stream or discharge side of the valve, consequently maintaining a constant predetermined gas pressure on the down stream side of the valve.

A further object is to provide a weighted lever acting against the diaphragm pressure and the weight of which may be varied for properly balancing the axially movable valve members against the pressure in the down stream side of the valve, whereby upon decrease of pressure on the down stream side, incident to demand, the balance valve will be opened and additional gas furnished for building up the pressure on the down stream side to adjusted pressure demand.

A further object is to provide a gas regulating valve whereby high pressure gas may be stepped downwardly through successive stages to a predetermined demand pressure and maintained at said pressure as used on the demand side of the valve. The successive reduction stages form means for preventing wire cutting of the parts which is a trade term for scoring, incident to high pressures.

A further object is to construct the parts whereby high pressure gas at the various stages will be directed against each other from different directions for counteracting their metal cutting forces, thereby preventing wearing of the parts incident to direction of high pressure gas streams against or across metallic parts.

A further object is to provide a regulator valve whereby the high pressure gas will be reduced in pressure by successive steps from the high pressure side of the valve to the lower pressure side, thereby preventing freezing, incident to the rapid expansion of the gas which is now a common difficulty experienced with devices of this character; it is now a common practice to heat the valve to prevent this freezing incident to rapid expansion.

A further object is to provide the upper end of the valve rod with a head having its upper surface in communication with the diaphragm chamber so that the pressure within the diaphragm chamber will normally force the same downwardly; by-pass means for supply pressure from the down stream side of the valve to the under side of the head around the valve stem and a further by-pass means cooperating with a surface carried by the lower end of the valve and of equal area to the area of the valve stem for furnishing the additional pressure surface displaced by the valve stem at the head for balancing the valve.

A further object is to provide double diaphragms within a diaphragm casing for controlling the upward and downward movement of the valve through leverage members within the chamber and weight control lever means carried by the diaphragm casing and moved by the outward and inward movement of the diaphragm and by the weight means carried thereby.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
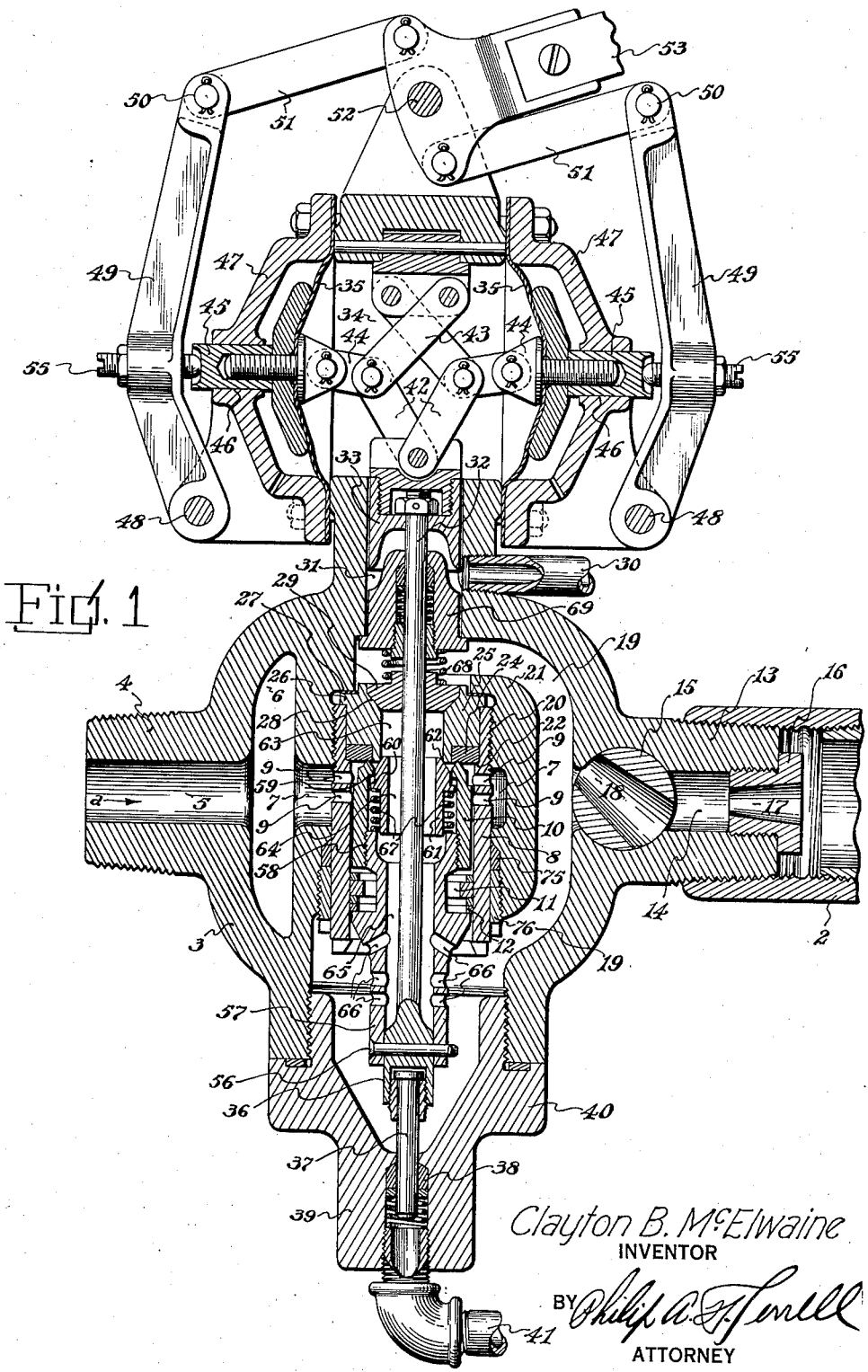
Figure 1 is a vertical longitudinal sectional view through the regulator valve, showing the valve in closed position.

To obtain the maximum efficiency and life of operation in a pressure regulator valve through which fluid, for instance gas, passes at high pressure, it is necessary to curb and tame the two destructive elements, i. e. velocity cutting blast and the freezing of gases by rapid expansion and the present invention is designed to overcome these difficulties, by reducing the pressure through successive reduction steps and in some cases in directing the flow of high pressure gas at angles where they will counteract the action of each other and prevent what is known as wire cutting of valve surfaces in gas engineering. Wire cutting is the scoring of valve seats and parts by the high pressure gases passing through the same, particularly as the valve is just opening or closing, and at which time the high pressure gas bites deeply into the metal and scores the same, usually in slotted formation, very much as if the surface has been sawed by a constantly reciprocating wire being held taut and moved across the surface.

The gas supply pipe 1 leads to any suitable source of gas supply, for instance a well which is usually of high pressure which can not be delivered and used under its terrific pressure. Well pressures run as high as 2000 pounds to the square inch and to deliver the gas to the consumer at a pressure which can be used, it is necessary to step down the pressure, usually to 200 pounds or less per square inch to the discharge pipe 2 on the down stream side of the valve. Disposed between the supply and discharge pipes 1 and 2 is the valve casing 3 of the regulator valve and which casing, at one side thereof, is provided with a threaded extension 4 having a passage 5 therethrough, through which gas flows in the direction of the arrow a. Threaded extension 4 is connected to the supply pipe 1 and its chamber is in communication with an entrance chamber 6 within the casing 3, and the gas, under high pressure is supplied to the chamber 6 and to the U-shaped chamber 7 extending around the valve cage sleeve 8, as clearly shown in Figure 1. The high pressure gas, under substantially the same pressure as in the supply pipe 1, fills chambers 6 and 7 at all times and enters through the valve cage sleeve 8 through ports 9 around the outer periphery of the outer valve 10, which is preferably annular as shown, and is loosely mounted within the sleeve 8 so that the gas can pass around the outer periphery thereof and into the packing ring groove 11 and expand the packing rings 12 therein for preventing leakage past the valve structure and causing a pressure overbalance to open. It will be noted that the rings 12 prevent escape past the valve structure by engagement with the bottom side of the groove 11.

Figure 2:
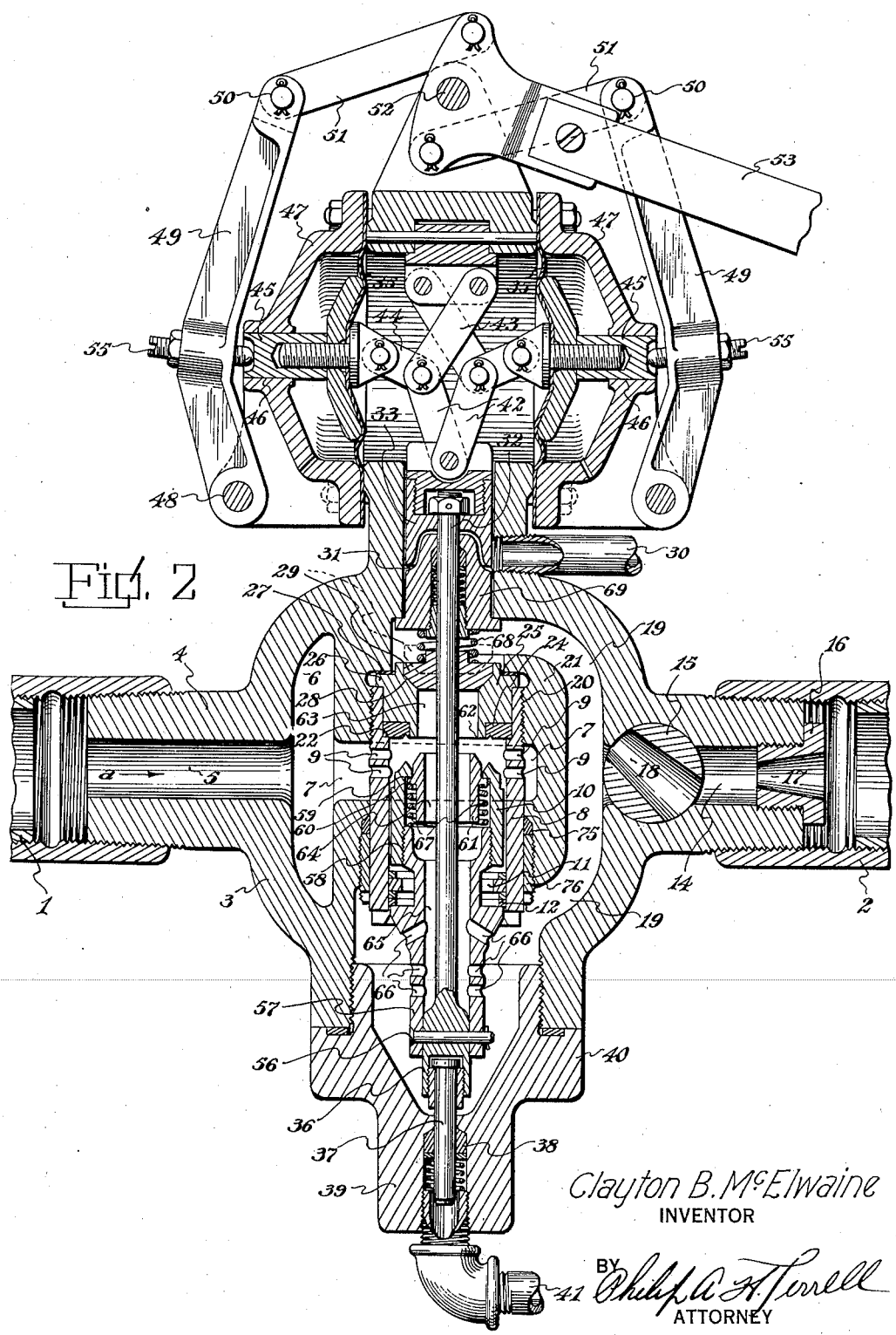
Figure 2 is a view similar to Figure 1, but showing the valve open for building up the pressure in the discharge or down stream side thereof to the predetermined pressure.

The present valve is an improvement on my prior Patent #2,013,869, wherein the valve action is broadly shown. The valve casing 3 is provided with a threaded extension 13 having a discharge port 14 therethrough and rotatably mounted transversely in said threaded extension is a plug valve 15, which acts as a choke valve for allowing the passage of a predetermined amount of gas to the discharge pipe 2. It is also provided with a nozzle 16 having a port 17 therethrough large enough to allow passage of the maximum demand which may be required. The choke valve 15 is set so that its port 18 will be open only far enough to allow passage of the usual demand. It will be noted that it is open in the drawings for allowing the passage of less gas than the maximum passage through the port 17 of the nozzle 16. The gas is stepped down through successive reduction passages until it enters the main discharge chamber 19 of the valve casing, and which chamber is U-shaped and extends around the down stream side of the valve as a whole. The valve cage sleeve is threaded at 20 into the inner valve core 21 of the casing and is provided with an internal shoulder 22, which engages the yieldable valve seat 24 which is annular shaped and is carried by the seat ring 25, which is in turn provided with an annular flange 26, which is forced upwardly against the shoulder 27 of the valve core portion 21 of the casing. Valve carrying ring 25 is provided with a valve seat 28 with which a spring pressed valve 29 cooperates. The baffle valve 29 is normally maintained seated, even when the valve is open as shown in Figure 2, however when there is an excessive demand on the down stream side of the valve as a whole, the valve 29 is unseated by the release of pressure on the down stream side and allows a by-passing of additional gas into the discharge chamber 19; ordinarily this baffle valve 29 remains seated.

The valve is automatically opened and closed by the pressure fluctuation in the down stream discharge pipe 2. When the pressure is being maintained, for instance at two hundred pounds, in the discharge pipe 2, the valve is in the position shown in Figure 1, however when the gas is used the pressure in the discharge pipe 2 decreases. The discharge pipe 2 is provided with a by-pass pipe 30, which extends upwardly and discharges into the chamber 31 of the casing 3 around the valve stem 32. It will be noted that the valve stem head 33 is loosely mounted in the casing, thereby allowing passage of gas around the head 33 and into the diaphragm chamber 34 between the flexible diaphragms 35, therefore it will be seen that the pressure of the down stream side of the valve will be maintained beneath the valve stem head 33 and also in the diaphragm chamber 34. To properly balance the valve as a whole, it will be necessary to provide a pressure surface of corresponding cross sectional area to the valve stem 32, and this is accomplished by providing the lower enlarged end 36 of the valve stem 32 with a guide shaft 37, which is slidably mounted in a stuffing box 38 in the lower extension 39 of the removable valve casing cap 40. This arrangement eliminates an upward piston action of an exposed area of the valve stem end, which would normally be subjected to the pressure in the pressure chamber 19. One end of the pressure supply pipe 41 discharges pressure against the end of the shaft 37 and is also connected to the discharge pipe 2 on the down stream side, also furnishing pressure balance.

The head 33 has connected pivotally thereto the lower links 42 of a lazy tong 43; the upper links of which are anchored at the upper end of the chamber 34. Lazy tong connection 43 is provided with link connections 44 with the diaphragms 35.

The diaphragms 35 are provided with extension shafts 45, which are slidably mounted in bearings 46 of the diaphragm casing covers 47. Pivotally mounted at 48 to the removable covers 47 adjacent their lower ends are upwardly extending levers 49, to the upper ends of which are pivotally connected at 50 inwardly extending links 51, the ends of which terminate at opposite sides of a transverse shaft 52 on which is pivotally mounted the weight lever 53, the outer end of which is adapted to receive regulating weights 54 which, when the pressure falls in the diaphragm chamber 34, pull downwardly on the lever, thereby rocking the pivoted levers 47 inwardly towards each other and through the adjusting screws 55, compressing the lazy tong connection 43, thereby forcing the valve stem 32 downwardly and the valve open for allowing the supplying of further gas under pressure to pass the valve structure, hereinafter set forth.

Figures 3, 4:
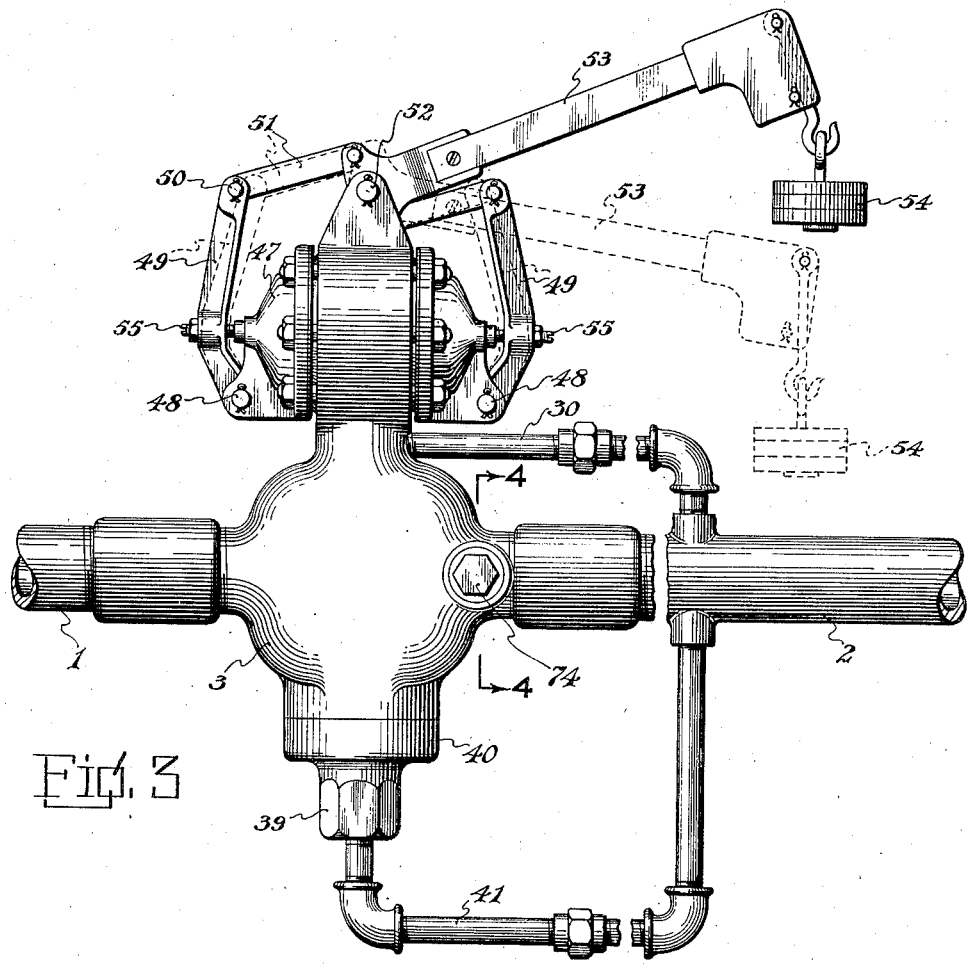
Figure 3 is a side elevation of the regulator valve showing the diaphragm control leverage means in the position assumed when the valve is closed as in Figure 1.
Figure 4 is a transverse sectional view through the choke valve on line 4—4 of Figure 3.

To put the device in operation or service the choke valve 15 is adjusted with the lever 53 down as shown in dotted lines in Figure 3 and to the maximum differential desired. This prevents what is known as "mercury blow" and gives the reducing unit a decided advantage and allows a build up of pressure between the valve and choke. After the pressure on the down stream side has been built up, the lever 53 is released and is maintained in raised position as shown in Figures 1 and 3 in full lines by the down stream pressure. When the down stream pressure falls there is an over-balancing of pressure when, in combination with the weight means, opens the valves. This opening takes place through the inward movement of the lazy tong connection 43, which forces the valve head 33, and valve stem 32 downwardly and as the head 36 of the valve stem 32 is pinned by means of a removable pin 56 to valve head 57 the valve is opened.

The sleeve valve 10, at its upper end, engages the yieldable valve seat 24, therefore as it is threaded at 58 on the valve head 57, it will be seen that it will move downwardly with the head 57, unseating in this movement. This allows pressure to pass to the interior of the sleeve valve 10 around its seating portion. As the valve stem 10 continues its downward movement its shoulder 59 comes into engagement with the flange 60 of the inner sleeve valve 61, and after this delayed action unseats the sleeve valve 61 at 62, thereby allowing the passage of gas at this pressure reduction stage inwardly and upwardly around the valve stem 32 and into the chamber 63 of the valve seat ring 25. It will be seen that the inrushing gas enters the chamber 63 in a cone form or in an inward direction around the valve 10, therefore they will create a turbulence and will counteract the wire cutting effect on the valve stem 32. The gas then passes downwardly through the chamber 64 of the inner sleeve valve 61, and thence through the chamber 65 of the valve head 57 and is discharged downwardly and outwardly through the discharge ports 66 into the reduced pressure chamber 19. It will be noted that the inner sleeve valve 61 is normally maintained seated by the expansion spring 67 until it is unseated by the downward movement of the outer sleeve valve 10. It will also be noted that there is a delayed action movement of the inner sleeve valve, thereby allowing successive reduction steps for the gas pressure. In case of a sudden and excessive demand on the down stream side of the baffle valve, the valve 29 unseats against the action of the expansion spring 68, which is interposed between the baffle valve 29 and the packing bushing 69, thereby furnishing, by by-pass means and rapidly, the necessary pressure to build up, in combination with the stepping down valve means, the previously set demand pressure.

As the gases rush into the chamber 19, it will be noted, particularly when the valve 29 is unseated and the gases are fed to the chamber 19 from the upper and lower sides of the valve structure, they will impinge each other at the choke valve point of the chamber, cause a turbulence and reduce their metal cutting effect to a minimum, thereby preventing the wire cutting or scoring of the choke valve port. After the gases pass the choke valve port 18, they enter the port 14 where they expand and thence go through the nozzle 17, which again provides a stepping down or choking effect. It will be noted that the pressure is successively stepped down from a high pressure to a demand low pressure and that gases passing through the valve structure will be impinged so as to counteract their effect and prevent scoring of parts.

As the head 33 rises, the inner sleeve valve 61 will quickly seat and the continued upward movement will seat the outer sleeve valve 10 against annular yieldable seat 24. It will be noted that the upper end of valve sleeve 61 tapers upwardly and inwardly for projecting the gases into the chamber 63 in a cone form for impinging the gases and preventing metal cutting of the valve stem 10. As the head 33 continues upwardly the lazy tong connection 43 expands, thereby forcing outwardly the slide shafts 45 against the adjusting screws 55, thereby rocking the levers 49 outwardly at their upper ends and again raising the weight arm 53. The above action continues from time to time according to the fluctuation of the down stream demand pressure.

The choke valve 15 is preferably threaded as shown in Figure 4 for preventing leakage and blow-out, and for preventing easy rotation and is provided with a shank 70, which extends outwardly and terminates in a wrench receiving portion 71. The shank 70 is also provided with a threaded portion 72 on which is threaded a lock nut 73 forming additional means for preventing rotation of the choke valve. The valve casing is provided with a removable plug 74 whereby access may be had to the interior of the casing.

It will be noted that the valve cage sleeve is packed by a packing member 75 and a bushing 76 threaded into the valve cage casing 21, and by removing the bushing 76 and unscrewing the valve cage sleeve, the valve as a whole may be removed after the casing cap 40 is unscrewed, more clearly defined in my copending application.

From the above it will be seen that a gas pressure reduction valve is provided wherein the pressure is stepped downwardly from the supply to the discharge sides of the valve, thereby preventing excessive expansion and freezing of the valve incident to rapid expansion of the gas, and the valve is constructed in a manner whereby it is controlled by the pressure in the discharge pipe or down stream side of the valve through diaphragm means, and that the valve will automatically maintain the predetermined pressure in the discharge pipe. By placing the pipes 30 and 41 in a position remote from the nozzle 16, the turbulence in the discharge pipe 2 adjacent the choke valve 15 and nozzle 16 will not extend to the pipes 30 and 41 and effect the operation of the diaphragm and parts as the gas and pressure passing through the pipes will be taken from the discharge pipe 2 at a point where the pressure is more constant.

The invention having been set forth what is claimed as new and useful is:

1. A pressure reduction valve for high pressure fluids comprising a casing, an intake chamber in said casing for the high pressure fluid, a discharge chamber in said casing for the reduced pressure fluid, an auxiliary casing within the main casing and between the intake chamber and the reduced pressure chamber, a valve cage sleeve threaded in the auxiliary casing and having ports in communication with the high pressure chamber, a valve seat ring mounted on the upper end of the valve cage sleeve and held in position by the valve cage sleeve, a valve stem extending axially through the valve cage sleeve, a sleeve valve carried by the valve stem and having a port therethrough in communication with the low pressure chamber and means for opening and closing the valve.

2. A device as set forth in claim 1 including a spring closed relief valve slidably mounted on the valve stem and cooperating with a seat carried by the valve seat ring.

3. A device as set forth in claim 1 wherein the upper end of the valve stem is provided with a head.

4. A valve structure comprising a valve seat having a chamber therein, a ported stationary valve sleeve carried by the seat and having a chamber therein, a valve sleeve within the ported sleeve and cooperating with the seat, a spring actuated delayed action valve sleeve carried by the sleeve within the ported sleeve and cooperating with the valve seat, a head carried by the valve sleeve within the ported sleeve, and a pressure balance valve stem extending through the head, the sleeves and the seat.

5. A device as set forth in claim 4 including a relief valve carried by the valve seat.

6. A device as set forth in claim 4 including a relief valve slidably mounted on the valve stem and cooperating with a seat carried by the first mentioned valve seat and normally closing the chamber therein.

7. A device as set forth in claim 4 including a spring actuated relief valve slidably mounted on the stem and normally closing the chamber in the first mentioned valve seat.

8. A device as set forth in claim 4 including means whereby the valve stem is balanced by pressure at the ends thereof.

9. A device as set forth in claim 4 including a chambered casing surrounding the valve sleeve structure and having ports of communication with the interior of the sleeve through the valve sleeve head.

10. A device as set forth in claim 4 including expansible packing rings carried by the head and engaging the inner periphery of the ported sleeve, said sleeve valve having a smaller exterior diameter than the interior diameter of the ported sleeve, thereby allowing pressure to build up behind the rings and expand the same.

11. A device as set forth in claim 4 wherein the seating ends of the sleeve valve and delayed action sleeve valve are bevelled at angles whereby pressure fluid entering the ported sleeve valve chamber will be deflected into the valve seat chamber around the stem and impinged, thereby creating turbulences.

CLAYTON B. McELWAINE.